(12) United States Patent
Ikuta et al.

(10) Patent No.: US 6,576,578 B1
(45) Date of Patent: Jun. 10, 2003

(54) SYNTHETIC QUARTZ GLASS AND METHOD FOR PREPARING THE SAME

(75) Inventors: Yoshiaki Ikuta, Kanagawa (JP); Shinya Kikugawa, Kanagawa (JP); Akio Masui, Tokyo (JP); Noriaki Shimodaira, Kanagawa (JP); Shuhei Yoshizawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/762,679

(22) PCT Filed: Jun. 9, 2000

(86) PCT No.: PCT/JP00/03778

§ 371 (c)(1),
(2), (4) Date: Mar. 1, 2001

(87) PCT Pub. No.: WO00/76923

PCT Pub. Date: Dec. 21, 2000

(30) Foreign Application Priority Data

Jun. 10, 1999 (JP) ............................................. 11-164190

(51) Int. Cl.⁷ .............................. C03C 3/06; C03B 20/00
(52) U.S. Cl. ......................... 501/54; 65/17.4; 65/17.6; 65/111
(58) Field of Search .............................. 501/54; 65/17.4, 65/17.6, 30.1, 111, 414, 417, 427

(56) References Cited

U.S. PATENT DOCUMENTS

| | | | |
|---|---|---|---|
| 5,326,729 A | | 7/1994 | Yaba et al. |
| 5,364,433 A | * | 11/1994 | Nishimura et al. ........... 501/54 |
| 6,174,830 B1 | * | 1/2001 | Jinbo et al. ................... 501/54 |
| 6,333,284 B1 | * | 12/2001 | Otsuka et al. ................. 430/5 |

FOREIGN PATENT DOCUMENTS

| | | |
|---|---|---|
| EP | 0 691 312 | 1/1996 |
| JP | 7-061823 | 3/1995 |
| JP | 9-235134 | 9/1997 |

* cited by examiner

*Primary Examiner*—David Sample
(74) *Attorney, Agent, or Firm*—Oblon, Spivak, McClelland, Maier & Neustadt, P.C.

(57) ABSTRACT

A synthetic quartz glass to be used for light with a wavelength of from 150 to 200 nm, wherein the OH group concentration is at most 100 ppm, the hydrogen molecule concentration is at most $1 \times 10^{17}$ molecules/cm³, reduction type defects are at most $1 \times 10^{15}$ defects/cm³, and the relation between $\Delta k_{163}$ and $\Delta k_{190}$, as between before and after irradiation of ultraviolet rays, satisfies $0 < \Delta k_{163} < \Delta k_{190}$, and a process for its production.

12 Claims, No Drawings

SYNTHETIC QUARTZ GLASS AND METHOD FOR PREPARING THE SAME

TECHNICAL FIELD

The present invention relates to a synthetic quartz glass for optical components to be used for an apparatus employing ultraviolet lights having wavelengths of from 150 to 200 nm as a light source, and a process for producing it, particularly to a synthetic quartz glass to be used as optical components such as a lens, a prism, a photomask, a pellicle and a material for windows, to be used for light within a range of from the vacuum ultraviolet region and the ultraviolet region, such as an ArF excimer laser (wavelength: 193 nm), a $F_2$ laser (wavelength: 157 nm), a low pressure mercury lamp (wavelength: 185 nm) or a $Xe_2\star$ excimer lamp (wavelength: 172 nm).

BACKGROUND ART

A synthetic quartz glass has such characteristics that it is a transparent material within a wavelength range of as wide as from the near infrared region to the ultraviolet region, it has an extremely small thermal expansion coefficient and is excellent in dimensional stability, and it contains substantially no metal impurity and has a high purity. Accordingly, a synthetic quartz glass has been mainly used for optical components of a conventional optical apparatus employing g-line or i-line as a light source.

Along with high-integration of LSI in recent years, techniques to draw finer and thinner lines have been required in an optical lithography technology to draw an integration circuit pattern on a wafer, and accordingly use of light having a shorter wavelength as an exposure light source has been promoted. For example, for a light source of a stepper for optical lithography, an ArF excimer laser (hereinafter referred to simply as an ArF laser) or a $F_2$ laser is now to be used, as advanced from conventional g-line (wavelength: 436 nm) and i-line (wavelength: 365 nm).

Further, a low pressure mercury lamp or a $Xe_2\star$ excimer lamp is used for an apparatus such as optical CVD, an apparatus for cleaning silicon wafers or an ozone-generation apparatus, and it is being developed to apply it to the optical lithography technology in future.

It is necessary to use a synthetic quartz glass for a gas filled tube of a lamp to be used for a low pressure mercury lamp or an excimer lamp, or an optical element to be used for an optical apparatus employing the above-mentioned short wavelength light source.

A synthetic quartz glass to be used for such optical systems, is required to have light transmittance within a wavelength range of from the ultraviolet region to the vacuum ultraviolet region, and it is required that the light transmittance at the service wavelength will not decrease after irradiation of light.

With a conventional synthetic quartz glass, if it is irradiated with light from a high energy light source such as an ArF laser or a $F_2$ laser, a new absorption band will be formed in a ultraviolet region, and such has been problematic for an optical component to be used for constituting an optical system employing an ArF laser or a $F_2$ laser as a light source.

If an ArF laser or a $F_2$ laser is applied for a long time, an absorption band (hereinafter referred to as a 214 nm absorption band) having a wavelength of 214 nm at the center, so-called an E' center ($\equiv$Si.), and an absorption band (hereinafter referred to as a 260 nm absorption band) having a wavelength of 260 nm at the center, so-called NBOHC (non-crosslinked oxygen radical: $\equiv$Si—O.), will be formed.

As a technique to suppress formation of such absorption bands, a method of incorporating at least 100 ppm of OH groups and at least $5\times10^{16}$ molecules/cm$^3$ of hydrogen molecules into a synthetic quartz glass which contains substantially no reduction type defects or oxidation type defects, has been proposed (JP-A-3-101282). It is disclosed that hydrogen molecules in the synthetic quartz glass have a function to mend defects such as E' centers or NBOHC formed by the ultraviolet ray irradiation, and the OH groups have a function to reduce the concentration of defect precursors which become E' centers or NBOHC when irradiated with ultraviolet rays.

However, as a result of a detailed research on the change in light transmittance of a synthetic quartz glass by ultraviolet ray irradiation, the present inventors have found that in the synthetic quartz glass, an absorption band (hereinafter referred to as a 163 nm absorption band) having a wavelength of 163 nm at the center, will be formed in addition to the 214 nm absorption band and the 260 nm absorption band. When it is used as an optical component for an apparatus employing light with a wavelength of at least 200 nm as a light source, the service wavelength and the 163 nm absorption band are apart, whereby there will be no substantial influence of the decrease in light transmittance due to formation of the 163 nm absorption band. However, in a case where it is used as an optical component for an apparatus employing light with a wavelength of from 150 to 200 nm as a light source, the light transmittance in the vicinity of the service wavelength will decrease due to formation of the 163 nm absorption band.

The present invention has an object to provide a synthetic quartz glass which is to be used for an apparatus employing ultraviolet rays having wavelengths of from 150 to 200 nm as a light source and which has high light transmittance at a wavelength of from 150 to 200 nm and is excellent in ultraviolet ray resistance (the light transmittance in the vicinity of the service wavelength will not decrease even when irradiated with light employing ultraviolet rays with wavelengths of from 150 to 200 nm as a light source), and a process for its production.

DISCLOSURE OF THE INVENTION

The present invention provides a synthetic quartz glass to be used for light with a wavelength of from 150 to 200 nm, wherein the OH group concentration in the synthetic quartz glass is at most 100 ppm, the hydrogen molecule concentration is at most $1\times10^{17}$ molecules/cm$^3$, reduction type defects are at most $1\times10^{15}$ defects/cm$^3$, and the relation between the change $\Delta k_{163}$ in the absorption coefficient at a wavelength of 163 nm and the change $\Delta k_{190}$ in the absorption coefficient at a wavelength of 190 nm, as between before and after irradiation of ultraviolet rays with a wavelength of at most 250 nm, satisfies $0<\Delta k_{163}<\Delta k_{190}$.

BEST MODE FOR CARRYING OUT THE INVENTION

It is important that the OH group concentration is at most 100 ppm (meant for weight ppm), and in a case where it is used as an optical component for an apparatus employing light in a vacuum ultraviolet region having a wavelength of at most 180 nm as a light source, the OH group concentration is preferably at most 50 ppm, particularly preferably at most 10 ppm. The lower the OH group concentration, the higher the light transmittance.

When a synthetic quartz glass containing hydrogen molecules is irradiated with ultraviolet rays, the 163 nm absorption band will be formed. The 163 nm absorption band is attributable to reduction type defects ($\equiv$Si—Si$\equiv$ bonds) and will substantially lower the light transmittance of ultraviolet rays with wavelengths of at most 200 nm. With a view to suppressing formation of the 163 nm absorption band, it is important that the hydrogen molecule concentration in the synthetic quartz glass is at most $1\times10^{17}$ molecules/cm$^3$, particularly preferably at most $3\times10^{16}$ molecules/cm$^3$.

To accomplish the object of the present invention, it is necessary to suppress formation of the 163 nm absorption band. The degree for suppression of formation of the 163 nm absorption band can be evaluated from the relation between the change $\Delta k_{163}$ in the absorption coefficient at a wavelength of 163 nm and the change $\Delta k_{190}$ in the absorption coefficient at a wavelength of 190 nm, as between before and after irradiation of ultraviolet rays with a wavelength of at most 250 nm. Namely, in the present invention, it is important that the relation of $0<\Delta k_{163}<\Delta k_{190}$ is satisfied.

Further, when irradiated with ultraviolet rays, reduction type defects ($\equiv$Si—Si$\equiv$ bonds) in the synthetic quartz glass permit formation of the 214 nm absorption band ($\equiv$Si.) by the formula $\equiv$Si—Si$\equiv$+hv$\rightarrow$$\equiv$Si.+$\equiv$Si. thereby to lower the light transmittance of ultraviolet rays at a wavelength of from 150 to 200 nm. Accordingly, in the present invention, it is important that the reduction type defects in the synthetic quartz glass are at most $1\times10^{15}$ defects/cm$^3$. The concentration of the reduction type defects can be obtained from the absorption intensity at a wavelength of 163 nm (Phys. Rev., B38, 12772 (1988)).

Further, when irradiated with ultraviolet rays, the oxidation type defects ($\equiv$Si—O—O—Si$\equiv$ bonds) in the synthetic quartz glass permit formation of the 260 nm absorption band ($\equiv$Si—O.) by the formula $\equiv$Si—O—O—Si$\equiv$+hv$\rightarrow$$\equiv$Si—O.+$\equiv$Si—O., whereby the light transmittance of ultraviolet rays at a wavelength of from 150 to 200 nm will be adversely affected depending upon the degree of the formation. Accordingly, in the present invention, it is preferred that the oxidation type defects in the synthetic quartz glass are at most $2\times10^{17}$ defects/cm$^3$. The concentration of the oxidation type defects can be obtained from the OH group concentration increased by heat treatment of the synthetic quartz glass (10 mm in thickness) in 100% hydrogen gas at 1 atm at 900° C. for 24 hours.

Further, in the present invention, chlorine element and metal impurities (such as alkali metals, alkaline earth metals, transition metals, etc.) in the synthetic quartz glass not only reduce the initial light transmittance in a wavelength range of from the vacuum ultraviolet region to the ultraviolet region but also cause to reduce the ultraviolet ray resistance. Accordingly, the smaller their contents, the better. The content of the metal impurities is preferably at most 100 ppb (meant for weight ppb), particularly preferably at most 10 ppb. The concentration of the chlorine element is preferably at most 100 ppm (meant for weight ppm), particularly preferably at most 10 ppm, further preferably at most 2 ppm.

The synthetic quartz glass of the present invention can be prepared by a direct method, a soot method (VAD method, OVD method) or a plasma method. Particularly preferred is a soot method, whereby control of the OH group concentration in the synthetic quartz glass is relatively easy, and the temperature of the preparation is low, which is advantageous with a view to avoiding inclusion of impurities such as chlorine and metals.

Further, the present invention provides a process for producing a synthetic quartz glass, which comprises carrying out in this order:

(1) a step of depositing and growing, on a substrate, fine particles of quartz glass obtained by subjecting a glass-forming material to flame hydrolysis in an oxidizing atmosphere, to form a porous quartz glass body;

(2) a step of heating the porous quartz glass body at a temperature of at least 1,400° C. to obtain a transparent glass body;

(3) a step of heating the transparent glass body in an atmosphere containing hydrogen to dope it with hydrogen; and (4) a step of heating the transparent glass body in an atmosphere containing no hydrogen for dehydrogenation treatment to obtain the above described synthetic quartz glass.

The glass-forming material may, for example, be a halogenated silicon compound (for example, a halide such as $SiCl_4$, $SiHCl_3$, $SiH_2Cl_2$ or $CH_3SiCl_3$, a fluoride such as $SiF_4$, $SiHF_3$ or $SiH_2F_2$, a bromide such as $SiBr_4$ or $SiHBr_3$, or an iodide such as $SiI_4$) or an alkoxysilane (for example, $R_nSi(OR)_{4-n}$ (wherein R is a $C_{1-4}$ alkyl group, and n is an integer of from 0 to 3)). With a view to reducing inclusion of impurities such as metals and chlorine, an alkoxysilane (particularly methyl trimethoxysilane, tetramethoxysilane, etc.) is preferred. Further, from the viewpoint of the operation efficiency or cost, $SiCl_4$ or the like is preferably employed.

As the substrate, a seed rod made of quartz glass can be used. Further, not only a rod shape, but also a plate-shaped substrate may be employed.

In the present invention, it is preferred to include, between steps (1) and (2), a step (1a) of heating the porous quartz glass body at a temperature of from 900 to 1300°C to remove water, with a view to adjusting the OH group concentration to at most 100 ppm. The atmosphere in this step (1a) is preferably an atmosphere comprising an inert gas such as helium as the main component (inclusive of a case where the inert gas is 100%). The pressure (the absolute pressure, the same applies hereinafter) is preferably a reduced pressure or atmospheric pressure, particularly preferably at most 100 Torr ($1.33\times10^4$ Pa), more preferably at most 10 Torr ($1.33\times10^3$ Pa).

Further, in the present invention, it is preferred to include, between steps (1) and (2), a step (1b) of exposing the porous quartz glass body to an atmosphere containing a fluorine-containing gas to dope it with fluorine, with a view to adjusting the OH group concentration to at most 100 ppm. In such a case, fluorine will be contained in the synthetic quartz glass in an amount of from 100 to 10000 ppm, preferably from 1000 to 8000 ppm, particularly preferably from 3000 to 8000 ppm. As the fluorine-containing gas, $SiF_4$, $SF_6$, $CHF_3$, $CF_4$ or $F_2$ may, for example, be mentioned. The atmosphere containing the fluorine-containing gas, is preferably an inert gas containing from 0.1 to 100 vol %, particularly from 0.1 to 25 vol %, of the fluorine-containing gas. In such a case, the temperature is preferably at most 600° C. In a case where fluorine is doped at a high temperature of from 500 to 1150° C., it is preferred to suppress formation of reduction type defects by using an atmosphere containing the fluorine-containing gas in an amount of from 0.1 to 100 vol %, particularly from 0.1 to 25 vol %, and further oxygen in an amount of from 5 to 95 vol %, particularly from 50 to 95 vol %. The pressure at the time of fluorine doping, is preferably from 0.1 to 10 atm (from $1.013\times10^4$ to $1.013\times10^6$ Pa). Further, the time is preferably from a few hours to a few tens hours.

In the present invention, when both steps of steps (1a) and (1b) are to be carried out, it is preferred to carry out step (1b) prior to step (1a).

In the present invention, it is preferred that the heating temperature in step (3) is at most 600° C. with a view to suppressing formation of reduction type defects.

Further, in the present invention, it is preferred that the heating temperature in step (4) is at most 600° C. with a view to suppressing formation of reduction type defects.

In the following Examples, Examples 1 to 6, 14 and correspond to Examples of the present invention, Examples 7 to 13 correspond to Comparative Examples.

EXAMPLE 1

A porous quartz glass body of 500 mm in diameter×600 mm was prepared by depositing and growing, on a substrate, fine particles of quartz glass formed by hydrolyzing $SiCl_4$ in an oxyhydrogen flame at a temperature of from 1200 to 1500° C. at an oxygen gas/hydrogen gas ratio (the volume ratio when $SiCl_4$ is regarded as 1) shown in the column for "$O_2/H_2$ volume ratio in step (1)" in Table 1 (step (1)).

The obtained porous quartz glass body was placed in an atmosphere-controllable electric furnace and heated to 1450° C. while the pressure was maintained under a reduced pressure of at most 10 Torr, and it was held at this temperature for 10 hours to obtain a transparent quartz glass body (200 mm in diameter×450 mm) (step (2)).

The obtained transparent quartz glass body was cut into 200 mm in diameter×10 mm to obtain a synthetic quartz glass.

EXAMPLE 2

A synthetic quartz glass was obtained in the same manner as in Example 1 except that between steps (1) and (2) in Example 1, the porous quartz glass body was treated under the pressure at the temperature for the time as shown in the column for "Pressure, temperature and time in steps (1a)" in Table 1 to remove water (step (1a)).

EXAMPLES 3, 11, 12 and 13

After obtaining a transparent quartz glass body (200 mm in diameter×450 mm) through steps similar to steps (1) and (2) in Example 1, the obtained transparent quartz glass body was cut into 200 mm in diameter×10 mm and treated with 100% hydrogen gas at 1 atm ($1.013×10^5$ Pa) at the temperature for the time as shown in the column for "Temperature and time in step (3)" in Table 1 to dope it with hydrogen (step (3)).

Then, with respect to Examples 3 and 13, dehydrogenation treatment was carried out by treating the doped product with 100% helium gas under 1 atm at the temperature for the time as identified in "Temperature and time in step (4)" in Table 1 (step (4)).

EXAMPLES 4, 5 and 7 to 10

A synthetic quartz glass was obtained in the same manner as in Example 3 except that between steps (1) and (2) in Example 3, the porous quartz glass body was treated under the pressure at the temperature for the time as shown in the column for "Pressure, temperature and time in step (1a)" in Table 1 (step (1a)).

EXAMPLES 6, 14 and 15

A synthetic quartz glass was obtained in the same manner as in Example 3 except that between steps (1) and (2) in Example 3, the porous quartz glass body was treated at the temperature for the time shown in the column for "Atmosphere, pressure, temperature and time in step (1b)" in Table 1 (step (1b)). With respect to the respective synthetic quartz glasses, the fluorine concentration was 400 ppm in Example 6, 4000 ppm in Example 14 and 5000 ppm in Example 15.

The OH group concentrations, the hydrogen molecule concentrations, the reduction type defect concentrations and the oxidation type defect concentrations in the synthetic quartz glasses obtained in Examples 1 to 15 are shown in Table 2. The contents of metal impurities in the synthetic quartz glasses obtained in Examples 1 to 15 were not higher than 10 ppb, and the concentrations of chlorine element were 5 ppm. The OH group concentration and the hydrogen molecule concentration were obtained by the following methods.

OH group concentration: Infrared spectrophotometry was carried out, and from the absorption peak at a wavelength of 2.7 μm, the OH concentration was obtained (Cer. Bull., 55(5), 524 (1976).

Hydrogen molecule concentration: Raman spectrometry was carried out, and from the intensity ratio ($I_{4135}/I_{800}$) of the intensity $I_{4135}$ detected from the scattering peak at 4135 $cm^{-1}$ in the laser Raman spectrum to the intensity $I_{800}$ of the scattering peak at 800 $cm^{-1}$ representing the fundamental vibration between silicon and oxygen, the hydrogen molecule concentration (molecules/$cm^3$) was obtained (Zh. Prikl. Spektrosk., 46(6), 987 (1986)). Here, the detectable limit by this method is $3×10^{16}$ molecules/$cm^3$.

Further, from the center portion of the obtained synthetic quartz glass of 200 mm in diameter×10 mm, a sample of 30 mm in diameter×10 mm was cut out for evaluation, and the surface of 30 mm in diameter was mirror-polished, whereupon the following evaluations were carried out.

An ArF laser beam was irradiated for $1×10^6$ pulses under a conditions of 100 mJ/$cm^2$/pulse and 100 Hz.

Further, the light transmittances at a wavelength of from 150 to 200 nm before and after irradiation of the above ArF laser beam were measured by means of a vacuum ultraviolet spectrophotometer (VTMS-502, manufactured by Acton Research Co.), and the change $\Delta k_{163}$ in the absorption coefficient at a wavelength of 163 nm and the change $\Delta kg_{190}$ in the absorption coefficient at a wavelength of 190 nm, as between before and after the irradiation were calculated from $\Delta k_{163}$=ln ($Tb_{163}/Ta_{163}$) and $\Delta k_{190}$=ln ($Tb_{190}/Ta_{190}$), respectively, to evaluate $\Delta k_{163}/k_{190}$. Here, $Tb_{163}$ is the initial 163 nm transmittance (%) prior to the ArF laser beam irradiation; $Ta_{163}$ is the 163 nm transmittance (%) after the ArF laser beam irradiation; $Tb_{109}$ is the initial 190 nm transmittance (%) prior to the ArF laser beam irradiation; and $Ta_{190}$ is the 190 nm transmittance (%) after the ArF laser beam irradiation. The results are shown in Table 3.

Using the above-mentioned vacuum ultraviolet spectrophotometer, the light transmittances at wavelengths of from 150 to 200 nm were measured. The light transmittances at wavelengths of from 150 to 200 nm were evaluated as represented by the light transmittance at a wavelength of 172 nm. The initial light transmittance at a wavelength of 172 nm and the light transmittance at a wavelength of 172 nm after irradiation of the ArF laser beam are shown in Table 3. Practically, it is important that the light transmittance at a wavelength of 172 nm after irradiation of the ArF laser is at least 80%.

TABLE 1

| Ex. | $O_2/H_2$ vol ratio in step (1) | Pressure temp. and time in step (1a) | Atmosphere, pressure, temp. and time in step (1b) | Temp. and time in step (3) | Temp. and time in step (4) |
|---|---|---|---|---|---|
| 1 | 18/25 | No step (1a) | No step (1b) | No step (3) | No step (4) |
| 2 | 15/25 | 13.3 Pa, 1200° C., 10 hr | No step (1b) | No step (3) | No step (4) |
| 3 | 15/25 | No step (1a) | No step (1b) | 500° C., 24 hr | 500° C., 24 hr |
| 4 | 15/25 | 13.3 Pa, 1200° C., 10 hr | No step (1b) | 500° C., 24 hr | 500° C., 24 hr |
| 5 | 15/25 | 13.3 Pa 1200° C., 10 hr | No step (1b) | 500° C., 24 hr | 500° C., 24 hr |
| 6 | 15/25 | No step (1a) | $SiF_4$/He = 1/99, 1 atm, room temp., 5 hr | 500° C., 24 hr | 500° C., 24 hr |
| 7 | 15/25 | 13.3 Pa, 1200° C., 10 hr | No step (1b) | 900° C., 24 hr | 500° C., 24 hr |
| 8 | 15/25 | 13.3 Pa, 1200° C., 10 hr | No step (1b) | 1200° C., 24 hr | 500° C., 24 hr |
| 9 | 15/25 | 13.3 Pa, 1200° C., 10 hr | No step (1b) | 500° C., 24 hr | 900° C., 24 hr |
| 10 | 15/25 | 13.3 Pa, 1200° C., 10 hr | No step (1b) | 500° C., 24 hr | 1200° C., 24 hr |
| 11 | 15/25 | 13.3 Pa, 1200° C., 10 hr | No step (1b) | 500° C., 24 hr | No step (4) |
| 12 | 15/25 | 13.3 Pa, 1200° C., 10 hr | No step (1b) | 500° C., 24 hr | No step (4) |
| 13 | 11/27 | No step (1a) | No step (1b) | 500° C., 24 hr | 500° C., 24 hr |
| 14 | 15/25 | No step (1a) | $SiF_4$/He/$O_2$ = =10/0/90, 1 atm, 1050° C., 10 hr | No step (3) | No step (4) |
| 15 | 15/25 | No step (1a) | $SiF_4$/He/$O_2$ = 10/10/801 atm, 1000° C., 10 hr | 500° C., 24 hr | 500° C., 24 hr |

TABLE 2

| Ex. | OH group concentration (ppm) | Hydrogen molecule concentration (molecules/cm$^3$) | Reduction type defect concentration (defects/cm$^3$) | Oxidation type defect concentration (defects/cm$^3$) |
|---|---|---|---|---|
| 1 | 94 | <3 × 10$^{16}$ | <1 × 10$^{15}$ | 4.5 × 10$^{17}$ |
| 2 | 31 | <3 × 10$^{16}$ | <1 × 10$^{15}$ | 2.3 × 10$^{17}$ |
| 3 | 86 | <3 × 10$^{16}$ | <1 × 10$^{15}$ | <2 × 10$^{17}$ |
| 4 | 32 | <3 × 10$^{16}$ | <1 × 10$^{15}$ | <2 × 10$^{17}$ |
| 5 | 12 | <3 × 10$^{16}$ | <1 × 10$^{15}$ | <2 × 10$^{17}$ |
| 6 | 4 | <3 × 10$^{16}$ | <1 × 10$^{15}$ | <2 × 10$^{17}$ |
| 7 | 30 | <3 × 10$^{16}$ | 1.5 × 10$^{15}$ | <2 × 10$^{17}$ |
| 8 | 30 | <3 × 10$^{16}$ | 6.3 × 10$^{15}$ | <2 × 10$^{17}$ |
| 9 | 30 | <3 × 10$^{16}$ | 1.3 × 10$^{15}$ | <2 × 10$^{17}$ |
| 10 | 31 | <3 × 10$^{16}$ | 5.8 × 10$^{15}$ | <2 × 10$^{17}$ |
| 11 | 33 | <7 × 10$^{16}$ | <1 × 10$^{15}$ | <2 × 10$^{17}$ |
| 12 | 33 | <3 × 10$^{17}$ | <1 × 10$^{15}$ | <2 × 10$^{17}$ |
| 13 | 180 | <3 × 10$^{16}$ | <1 × 10$^{15}$ | <2 × 10$^{17}$ |
| 14 | 0.8 | <3 × 10$^{17}$ | <1 × 10$^{15}$ | <2 × 10$^{17}$ |
| 15 | 1.3 | <3 × 10$^{16}$ | <1 × 10$^{15}$ | <2 × 10$^{17}$ |

TABLE 3

| Ex. | $\Delta k_{163}$ (1/cm) | $\Delta k_{190}$ (1/cm) | $\Delta k_{163}/\Delta k_{190}$ | Initial transmittance at 172 nm (%) | Transmittance at 172 nm after irradiation of ArF laser (%) |
|---|---|---|---|---|---|
| 1 | 2.3 × 10$^{-2}$ | 6.5 × 10$^{-2}$ | 0.35 | 83.5 | 81.1 |
| 2 | 8.7 × 10$^{-4}$ | 3.0 × 10$^{-3}$ | 0.29 | 87.0 | 86.9 |
| 3 | 6.0 × 10$^{-4}$ | 1.9 × 10$^{-3}$ | 0.32 | 83.9 | 83.8 |
| 4 | 1.6 × 10$^{-4}$ | 4.9 × 10$^{-4}$ | 0.33 | 87.0 | 87.0 |
| 5 | 6.3 × 10$^{-5}$ | 1.9 × 10$^{-4}$ | 0.33 | 88.4 | 88.4 |
| 6 | 2.8 × 10$^{-5}$ | 8.7 × 10$^{-5}$ | 0.32 | 89.2 | 89.2 |
| 7 | −1.1 × 10$^{-1}$ | 2.5 × 10$^{-1}$ | −0.44 | 79.1 | 75.0 |
| 8 | −4.4 × 10$^{-1}$ | 1.1 × 10$^{0}$ | −0.40 | 58.3 | 46.5 |
| 9 | −9.6 × 10$^{-2}$ | 2.3 × 10$^{-1}$ | −0.42 | 79.8 | 75.9 |
| 10 | −4.0 × 10$^{-1}$ | 9.6 × 10$^{-1}$ | −0.42 | 60.2 | 49.0 |
| 11 | 2.6 × 10$^{-1}$ | 1.5 × 10$^{-2}$ | 17.3 | 86.9 | 73.9 |
| 12 | 4.2 × 10$^{-1}$ | 2.4 × 10$^{-2}$ | 17.5 | 86.9 | 66.8 |
| 13 | 3.5 × 10$^{-3}$ | 1.0 × 10$^{-2}$ | 0.35 | 79.7 | 79.3 |
| 14 | 4.3 × 10$^{-6}$ | 1.2 × 10$^{-4}$ | 0.31 | 87.2 | 86.9 |
| 15 | 2.8 × 10$^{-6}$ | 8.9 × 10$^{-5}$ | 0.30 | 89.3 | 89.1 |

INDUSTRIAL APPLICABILITY

The synthetic quartz glass of the present invention is useful for an apparatus employing ultraviolet lights with a wavelength of from 150 to 200 nm as a light source, and it has high light transmittance at a wavelength of from 150 to 200 nm and is excellent in ultraviolet ray resistance.

Further, according to the process of the present invention, a synthetic quartz glass which is useful for an apparatus employing ultraviolet lights with a wavelength of from 150 to 200 nm as a light source and which has high light transmittance at a wavelength of from 150 to 200 nm and is excellent in ultraviolet ray resistance, can be simply prepared.

What is claimed is:

1. A synthetic quartz glass for use with light with a wavelength ranging from 150 to 200 nm, wherein the OH group concentration in the synthetic quartz glass is at most 100 ppm, the hydrogen molecule concentration is at most $1 \times 10^{17}$ molecules/cm$^3$, reduction type defects are at most $1 \times 10^{15}$ defects/cm$^3$, oxidation type defects are at most $2 \times 10^{17}$ and the relation between the change $\Delta k_{163}$ in the absorption coefficient at a wavelength of 163 nm and the change $\Delta k_{190}$ in the absorption coefficient at a wavelength of 190 nm, before and after radiation of the glass with ultraviolet rays with a wavelength of at most 150 nm, satisfies the expression $0 < \Delta k_{163} < k_{190}$.

2. The synthetic quartz glass according to claim 1, wherein the fluorine concentration ranges from 100 to 10,000 ppm.

3. The synthetic quartz glass according to claim 1 or 2, wherein the fluorine concentration ranges from 1,000 to 8,000 ppm.

4. A process for producing a synthetic quartz glass, which comprises the following steps in the stated order:

(1) depositing and growing, on a substrate, fine particles of quartz glass obtained by subjecting a glass-forming material to flame hydrolysis in an oxidizing atmosphere, to form a porous quartz glass body;

(2) heating the porous glass body at a temperature of at least 1,400° C., thereby obtaining a transparent glass body;

(3) heating the transparent glass body in an atmosphere containing hydrogen, thereby doping the glass body with hydrogen; and (4) heating the transparent glass body in an atmosphere containing no hydrogen, thereby dehydrogenating the glass body and producing a synthetic quartz glass having an OH group content of at most 100 ppm, a hydrogen molecule concentration of at most $1 \times 10^{17}$ molecules/cm$^3$, reduction type defects of at most $1 \times 10^{15}$ defects/cm$^3$, oxidation type defects of at most $2 \times 10^{17}$ and exhibiting a relationship between the change $\Delta k_{163}$ in the absorption coefficient at a wavelength of 163 nm and the change $\Delta k_{190}$ in the absorption coefficient at a wavelength of 190 nm, before and after irradiation with ultraviolet radiation having a wavelength of at most 250 nm, which satisfies the expression: $0 < \Delta k_{163} < \Delta k_{190}$.

5. The process according to claim 4, which comprises, between steps (1) and (2), in a step (1a), heating the porous glass body at a temperature of 900 to 1,300° C., thereby removing water from the glass body.

6. The process according to claim 5, which comprises, between steps (1) and (2) and after step (a), in a step (1b), exposing the porous quartz glass body to an atmosphere containing a fluorine-containing gas, thereby doping the glass body with fluorine.

7. The process according to claim 4, wherein the glass-forming material is a halogenated silicon compound or an alkoxysilane.

8. The process according to claim 7, wherein the halogenated silicon compound is $SiCl_4$, $SiHCl_3$, $SiH_2Cl_2$, $CH_3SiCl_3$, $SiF_4$, $SiHF_3$, $SiH_2F_2$, $SiBr_4$, $SiHBr_3$ or $SiI_4$ and said alkoxysilane is $R_nSi(OR)_{4-n}$, wherein R is $C_{1-4}$-alkyl and n is 0 to 3.

9. The process according to claim 5, wherein the heating of step (1a) is conducted in an atmosphere comprising an inert gas.

10. The process according to claim 6, wherein the fluorine-containing gas is $SiF_4$, $SF_6$, $CHF_3$, $CF_4$ or $F_2$.

11. The process according to claim 6, wherein the fluorine-containing gas is an inert gas atmosphere containing from 0.1 to 100 vol % of the fluorine-containing gas.

12. The process according to claim 6, wherein the fluorine is doped into the glass body at a temperature of 500 to 1150° C.

* * * * *